UNITED STATES PATENT OFFICE.

CARL WEILBIER, OF HANOVER, GERMANY.

PROCESS FOR THE MANUFACTURE OF IMPREGNATED GLOVES.

No. 825,435.     Specification of Letters Patent.     Patented July 10, 1906.

Application filed December 27, 1905. Serial No. 293,531.

*To all whom it may concern:*

Be it known that I, CARL WEILBIER, a subject of the German Emperor, residing at Hanover, in the Kingdom of Prussia, and in the Empire of Germany, have invented certain new and useful Improvements in Processes for the Manufacture of Impregnated Gloves Which are Insulated Against Electric Currents, of which the following is a specification.

This invention relates to the manufacture of gloves for the use of electricians; and the object of the invention is a process for impregnating chamois-leather or other suitable similar or equivalent skin, hide, or other material of which said gloves are made, which without rendering it entirely impervious to moisture shall constitute an effective insulation against the passage of the electric current of seven hundred volts or more, and thereby protect the wearer of such gloves from danger by touching electric conductors or charged electric bodies.

The skin, hide, or leather, and especially chamois-leather, out of which the gloves have been made is boiled, if necessary, in a strong aqueous solution of soda in order to free it from fatty materials, if any, that it may contain. There are next taken accurately or approximately eight hundred (800) grams of iron sulfate (green vitriol) and five hundred and seventy-six (576) grams of sodium nitrate (soda saltpeter) dissolved in one thousand (1,000) and seven hundred (700) grams, respectively, of boiling water and two hundred and fifty grams of sulfuric acid mixed with four hundred grams of water. The three solutions are allowed to cool. These three thus cooled solutions are then mixed together and the resulting mixture or compound solution boiled until there results a dark-red viscid mass which gives off by heating a red vapor. In a twenty (20) to twenty-five (25) per cent. aqueous solution of this resulting mass the gloves are boiled until they are thoroughly imbued therewith, after which they are rinsed in water and then dried, whereupon they are then ready for use for the purpose for which they were intended.

What I claim as my invention is—

The method of insulating gloves consisting in impregnating them with a compound aqueous solution of iron sufate, sodium nitrate and sulfuric acid prepared by separately dissolving these substances in water, cooling and mixing the solutions, boiling the mixture to a viscid mass and again dissolving it in boiling water.

In witness whereof I have signed this specification in the presence of two witnesses.

CARL WEILBIER.

Witnesses:
   LEONORE RASCH,
   ANNA DIPPEL.